United States Patent Office 2,850,550
Patented Sept. 2, 1958

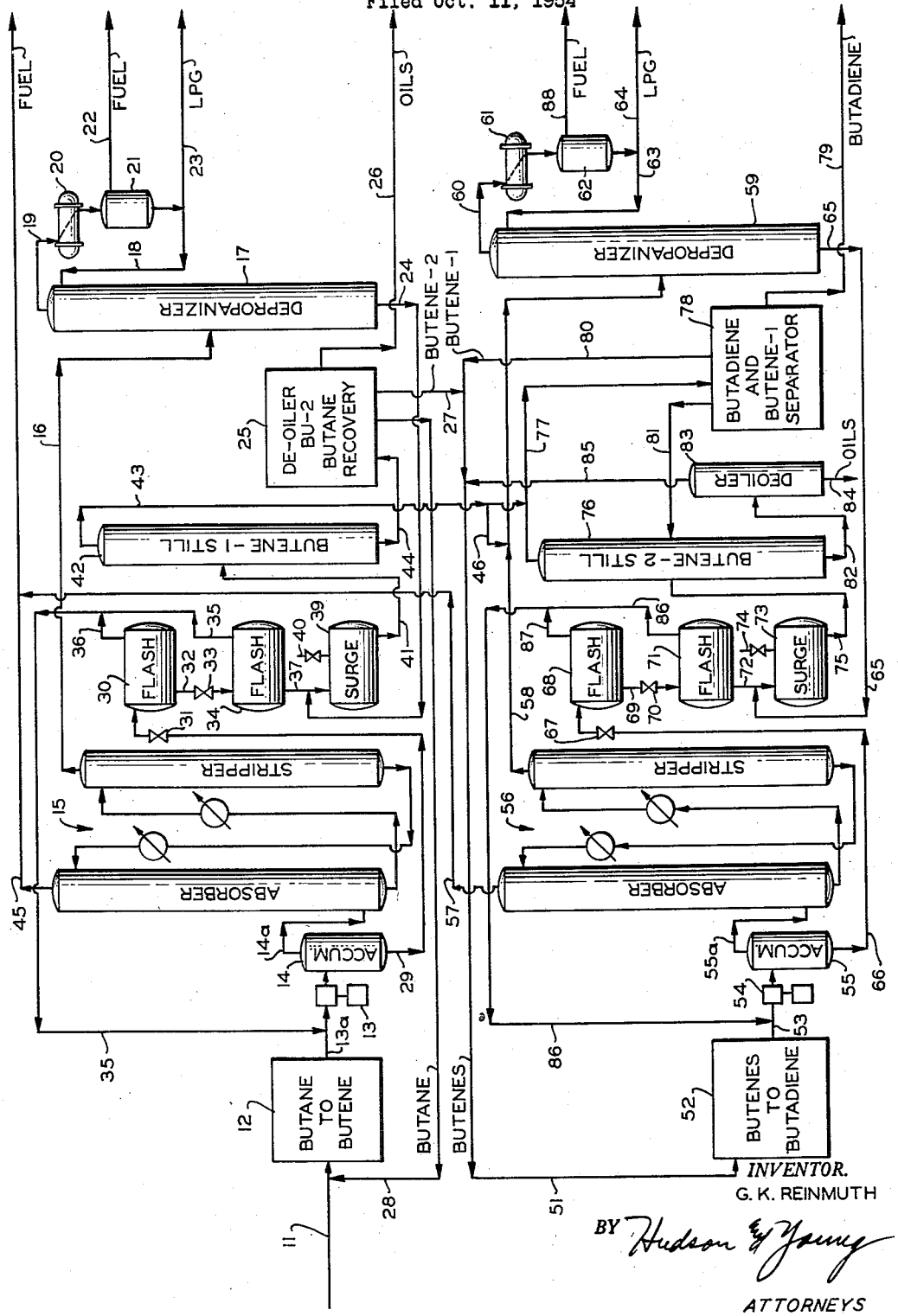

2,850,550

INHIBITING POLYMER FORMATION IN THE SEPARATION OF BUTENE-1 AND BUTENE-2 PRODUCED IN THE CATALYTIC DEHYDROGENATION OF N-BUTANE

Gene K. Reinmuth, Borger, Tex., assignor to Phillips Petroleum Company, a corporation of Delaware Application October 11, 1954, Serial No. 461,335

5 Claims. (Cl. 260—680)

This invention relates to a process for producing butadiene from n-butane wherein the depropanizer still is operated with a minimum of formation of polymeric material in the still. In one aspect it relates to a method for the catalytic production of butadiene from n-butane wherein propane and lower boiling constituents of the effluent materials containing polymerizable hydrocarbons from the butane and butene dehydrogenation steps are fractionated in depropanizer stills at sufficiently high temperatures and pressures to produce commercially acceptable LPG products without or substantially without deposition of polymeric material in the depropanizer stills. In another aspect it relates to a method for conditioning the feeds to the depropanizer stills treating effluent materials from the butane and butene dehydrogenation steps of a catalytic butane to butadiene operation so that these stills can be operated for the production of commercially acceptable LPG products without or substantially without deposition of solid polymeric material in the stills.

In the production of butadiene from n-butane by the two-stage catalytic process, polymerizable materials are formed in (1) the dehydrogenation of n-butane to butene, and also in (2) the dehydrogenation of butene to butadiene. When the effluents from these two dehydrogenation steps are processed for the separation, operation and recovery of the various products, polymerizable materials are polymerized in the depropanizer stills and in the butene-1 still (separation of butane-1) at the temperatures and pressures carried in the kettle sections of these stills when they are operated under sufficiently high temperatures and pressures to give the desired separations. In the process of converting butane to butadiene four process steps are involved and a brief explanation of these several steps will explain the conditions under which difficulty is expected in operating the prior art process. By steps I is meant the catalytic dehydrogenation of n-butane to butene and ordinarily included in the general process of step I is a mineral seal oil absorption and stripper operation for the separation of normally gaseous materials which are produced in the process and which are ordinarily included in fuel gas and LPG products. Such gases are considered by-products of this operation. Step I includes the use of compressors, one or more heaters, passage of the charge material through a catalyst, heat exchangers, quench steps and the aforementioned mineral seal oil absorption-stripping step.

Step II of the general operation includes treatment of the butene-containing product of step I to separate butene-1,1,3-butadiene and lower boiling hydrocarbons from butene-2, butane and higher boiling hydrocarbons, and to recover butene-2 for pasage as feed stock to step III. Step II also involves separation of LPG products from the butene-1 fraction.

Step III of this operation includes another catalytic dehydrogenation operation in which the butene-2 and butene-1 are dehydrogenated to form butadiene. Included in this step also is a mineral seal oil absorber-stripper operation for separating a material containing normally gaseous hydrocarbons suitable for fuel and for LPG.

Step IV includes depropanization of the step III effluent, separation and recovery of an LPG product, and separation and recovery of butadiene from unconverted butenes.

When the depropanizers of steps II and IV are operated under sufficiently high temperatures and pressures to produce commercially acceptable LPG overhead products polymerizable materials in the feed to these depropanizers become polymerized and deposited on the heat exchange equipment and associated parts in the stills. These deposits become sufficiently thick that the depropanizers have to be shut down at frequent intervals for cleaning. A complete cleaning operation involves two parts, (1) cleaning or removing deposited polymeric material from the tubes of the kettle heat exchangers and, (2) cleaning or removal of the deposited polymeric material from the vapor-liquid contacting apparatus within the towers. The heat exchanger bundles in the depropanizers have to be cleaned at relatively frequent intervals, for example, weekly, while the remainder of the towers may be operated as long as a month between cleanings. At the present time removing of deposited polymeric material from a heat exchanger bundle involves a labor cost of about one hundred dollars. The cost for removing or cleaning the deposited material from the remainder of the depropanizer column is about five hundred dollars. One method for removing deposited material from heat exchange bundles is by burning. This material can be removed more quickly by burning than by other methods, hence burning is ordinarily employed. It is obvious, however, that each time a heat exchanger bundle is burned it deteriorates slightly and after repeated burnings exchanger bundles have to be discarded. Deposited material is ordinarily burned from the inside of the column and such an operation has to be very carefully controlled in order to prevent over heating. Each time a heat exchanger bundle is removed from the column for cleaning and reassembled in the column a fire hazard exists when the column is put on-stream because of possible leakage at the flanges.

It seems that the depropanizer still of step IV in the prior art operation has to be cleaned at more frequent intervals than the depropanizer still of step II because there are more and/or more easily polymerizable materials in the feed to the step IV depropanizer than in the feed to the step II depropanizer. Thus, in prior art operation it has been found that the step II depropanizer can be cleaned at less frequent intervals than the step IV depropanizer and yet produce a commercially acceptable LPG product as the overhead product of the still.

An object of my invention is to provide a method for operating the aforementioned depropanizer stills and butene-1 still and associated apparatus to eliminate or substantially reduce the deposition of polymeric material under conditions of depropanizer operation suitable for producing a commercially acceptable LPG product.

Another object of my invention is to provide a process which involves as little alteration in equipment as possible from that now in use to accomplish the aforementioned object.

Yet another object of my invention is to provide a process which can be installed and operated at a minimum of cost for the elimination or substantial elimination of polymer deposition troubles in such depropanizing stills.

Yet other objects and advantages of my invention will be realized upon reading the following description, which, taken with the attached drawing forms a part of this specification.

I accomplish these and other objects by flashing the propane and lighter hydrocarbons from the effluent products of the dehydrogenation steps with the result that the subsequent butene-1 and butene-2 columns are operated at low temperatures and pressures without substantial polymer deposition. Relatively high still temperatures and pressures are then carried in the depropanizer stills with production of commercially acceptable LPG products.

By a commercially acceptable LPG product I mean a liquefied petroleum gas containing about 90 to 95 percent propane and propylene with substantially no ethane.

In the drawing, the figure illustrates in diagrammatic form an arrangement of apparatus parts for carrying out the process of my invention.

In the figure is illustrated an entire process beginning with normal butane as charge stock for the production of butadiene. The n-butane charge stock is passed from a source, not shown, through a pipe 11 into apparatus 12 which is intended to include all apparatus involved in the dehydrogenation of butane to butene. Effluent material from this dehydrogenation step is passed through a pipe 13a and is compressed by a compressor 13 and the compressed material is passed into an accumulator 14. A vaporous material separated in this accumulator is treated in a mineral seal oil absorber-stripping system 15 for the separation of a fuel gas product which is removed through a pipe 45. The hydrocarbon material which is removed overhead from the stripper of this system is passed through a pipe 16 into a depropanizer 17 which is operated at such conditions of temperature and pressures as to produce a commercially acceptable LPG product. Overhead material from this depropanizer is passed therefrom through a pipe 19 to a condenser 20 and condensate is passed to an accumulator tank 21. That condensate required for refluxing is passed through a pipe 18 into depropanizer while that not required for reflux is passed through a pipe 23 as an LPG product of the process to storage or other disposal, as desired. A pipe 22 is for removal of uncondensed gases which are passed to fuel or other use as desired.

The absorber-stripper 15 is operated under more or less conventional absorber-stripper conditions as are well known by those skilled in the art. The mineral seal oil is a hydrocarbon oil of about 180 molecular weight.

The liquid phase which separates from the vapors in the accumulator 14 is passed through a pipe 29 and through a pressure reducing valve 31 into a flash tank 30. Liquid from the flash tank 30 is passed through a pipe 32 and through another pressure reducing valve 33 into a second flash tank 34. Liquid from this second flash tank is passed through a pipe 37 into a surge tank 39. A pipe 40 is provided for pressure relief from surge tank 39 if necessary. Flashed vapors from flash tank 30 are passed through a pipe 36 and are combined with flash vapors from tank 34 passing through a pipe 35. All of these flash vapors from pipe 35 are combined with the effluent from the butane dehydrogenation step passing through pipe 13a just ahead of compressor 13. These two flashing steps in tanks 30 and 34 are intended to remove all or substantially all of the propane from the feed to the flash vessels so that the flash liquid will not need to be distilled in the butene-1 column 42 under high depropanizing temperature and pressure.

The kettle product from depropanizer 17 is passed through a pipe 24 and is combined with material in pipe 37 and it is the combined stream which is introduced into surge tank 39. Material from surge tank 39 is passed through a pipe 41 into a butene-1 still 42 and butene-1 is separated under such mild temperature and pressure conditions that polymer does not deposite out on the exchanger or on the interior of the vessel. Bottoms material from the butene-1 still is removed therefrom and is passed through a pipe 44 into a recovery system 25 in which butene is recovered and is passed through pipes 27 and 51 to a dehydrogenation step to be described subsequently. In this recovery system 25 oils containing C₅ and higher boiling hydrocarbons are separated and are withdrawn through a pipe 26 for such disposal as desired. In this system n-butane which survived the butane dehydrogenation step is separated and is passed through a pipe 28 and is introduced into the butane dehydrogenation step by way of pipe 11.

The subsequent dehydrogenation step which is the dehydrogenation of butenes to butadiene is carried out in system 52. This system includes the catalyst and all apparatus involved in carrying out this catalytic reaction. Effluent from this dehydrogenation operation is removed through a pipe 53, is compressed by a compressor 54 and the compressed material is introduced into an accumulator 55. In this accumulator vaporous material is removed and is treated in an absorber-stripping system 56 in which hydrocarbons suitable for use in fuel gas are separated and passed therefrom through a pipe 57 for such disposal, as desired, for example, this gas is illustrated as being combined with the gas in pipe 45, or it can be kept separate. Hydrocarbons recovered from the mineral seal oil in the stripper are passed through a pipe 58 into a depropanizer still 59. From this depropanizer, overhead vapors are removed through a line 60 and are partially condensed in a condenser 61. Material from the condenser flows into vessel 62 and the uncondensed gas is withdrawn through a line 88 as a high colorific fuel gas for passage to such disposal as desired. Condensate from vessel 62 is removed and that portion required for refluxing is passed through a line 63 into the depropanizer while that not needed for refluxing is removed from the system through a pipe 64 as a commercial LPG product.

The liquid which separates from vapors in the accumulator 55 is passed through a pipe 66 and a pressure reduction valve 67 into a flash tank 68. Liquid from this flash tank is passed through a pipe 69 containing a pressure reducing valve 70 into another flash tank 71. Flash vapors from tank 71 are passed through a pipe 86 and are combined with flash vapors from tank 68 passing through a pipe 87 and these combined flash vapors are added to the effluent from the butenes to butadiene dehydrogenation step in pipe 53. The flashed vapors from pipe 86 added to material in pipe 53 contain all or substantially all of the propane and lower boiling materials than propane from the liquid feed into the flash tanks. Liquid from flash tank 71 is passed through a pipe 72 into a surge tank 73 and the bottoms product of a depropanizer column 59 are passed through a pipe 65 also into the surge tank 73. A valved pipe 74 is provided in case pressure relief from surge tank 73 is necessary. The gases passed through pipe 55a into the absorber of system 56 are intended to contain all or substantially all of the propane and materials boiling lower than propane from the effluent of the dehydrogenation system 52. Liquid from surge tank 73 is passed through a pipe 75 into a butene-2 still 76. From this still hydrocarbons boiling higher than butadiene are removed as kettle product through a pipe 82 and are passed into a deoiler still 83 in which hydrocarbons boiling higher than the butenes are separated, and a kettle product being removed via a pipe 84 while the butenes are removed through a pipe 85 and are added to the material in pipe 27 and this combined stream is passed on through pipe 51 into the dehydrogenation system 52. The butadiene containing material separated in the butene-2 still is passed through an overhead line 77 into a butadiene-butene separation system 78. In this system butadiene is separated and is passed through a line 79 as the main product of the process while recovered butenes are separated and are passed through a pipe 80 to be combined with the deoiler overhead material from pipe 85 and buene-2 from pipe 27. A product of intermediate composition containing butene and butadiene is also separated in system 78 and is passed through a pipe 81 as a recycle material into the butene-2 still 76 or other use as desired.

I have found by removing all or substantially all of the propane content from the effluent of the dehydrogenation operation 52 in flash vessels 68 and 71 and in accumulator 55 that the liquid from accumulator 55 (surge tank 73) does not need to be subjected to such a high depropanizing temperature that polymers deposit out in the butene-2 still. Thus, this liquid which is substantially free of propane is passed directly to a butene-2 still in which butene-2 is separated under relatively mild temperatures, that is, not high enough to cause polymerization of polymerizable material. The accumulator gas, containing propane and lower boiling hydrocarbons and some higher boiling material, is passed via pipe 55a into the absorber of assembly 56. In this absorber the gas feed is contacted with a more or less conventional mineral seal oil, for example, a hydrocarbon oil of about 180 molecular weight. Hydrocarbons stripped from the absorption oil are passed via pipe 58 into a depropanizer still 59. Overhead gases are passed through a pipe 60 to a condenser 61 and condensate is passed to accumulator 62. Uncondensed gas is passed via pipe 88 as a high B. t. u. gas for such disposal as desired. This gas can be combined with the high B. t. u. gas in pipe 22, or it can be kept separate, as desired. Condensate required for refluxing is passed through pipe 63 into the depropanizer while that not needed for refluxing is withdrawn from the system in pipe 64 to be combined with the LPG in pipe 23 or kept as a separate LPG product, if desired. This depropanizer is operated at such temperature and pressure that specification LPG is produced. The column can be so operated because any polymerizable material in the gases separated in accumulator 55 are retained in the absorption oil.

The depropanizer still 17 is operated for long periods of time with little to no trouble because of polymer deposition on its reboiler coils or on the vessel walls or vapor-liquid contacting apparatus. This freedom from polymer formation is due to the polymerizable material having been retained by the absorption oil in the absorption-stripper system 15. Depropanizer 17 is then operated at sufficiently high temperatures and pressures to produce a specification LPG.

Tables 1 and 2 give a comparative run data illustrating the operating conditions and stream compositions of the proces of my invention and prior art for comparison.

*Table 1*

| Apparatus part | Operating conditions | |
| --- | --- | --- |
| | Process of invention | Prior art |
| 17-depropanizer: | | |
| Top | 140° F., 300 p. s. i. g | 140° F., 300 p. s. i. g. |
| Kettle | 265° F., 305 p. s. i. g | 265° F., 305 p. s. i. g. |
| 42-butene-1 still: | | |
| Top | 125° F., 115 p. s. i. g | 150° F., 160 p. s. i. g. |
| Kettle | 165° F., 125 p. s. i. g | 190° F., 170 p. s. i. g. |
| 59-depropanizer: | | |
| Top | 140° F., 300 p. s. i. g | 140° F., 200 p. s. i. g. |
| Kettle | 265° F., 305 p. s. i. g | 220° F., 205 p. s. i. g. |
| 76-butene-2 still: | | |
| Top | 140° F., 100 p. s. i. g | 140° F., 98 p. s. i. g. |
| Kettle | 167° F., 110 p. s. i. g | 165° F., 108 p. s. i. g. |
| 14-accumulator | 90° F., 180 p. s. i. g | 90° F., 180 p. s. i. g. |
| 30-flash tank | 120 p. s. i. g | |
| 34-flash tank | 80 p. s. i. g | |
| 55-accumulator | 90° F., 180 p. s. i. g | 90° F., 180 p. s. i. g. |
| 68-flash tank | 120 p. s. i. g | |
| 71-flash tank | 80 p. s. i. g | |

*Table 2*

| Apparatus part | $C_3$ Hydrocarbon content of stream | |
| --- | --- | --- |
| | Process of invention | Prior art |
| | Percent | Percent |
| 29 | 4 | 4 |
| 16 | 30 | 30 |
| 41 (feed to butene-1 still) | 2 | 7.5 |
| 37 | 1 | |
| 24 | 0 | 0 |
| 66 | 1 6 | 6 |
| 72 | 3 | |
| 75 (feed to butene-2 still) | 2 | 0 |
| 65 | 0 | 0 |

[1] Pipes 58 and 16.

By removing hydrocarbon gases from the accumulator bottoms in flashing steps, I am able to operate the butene-1 and the butene-2 stills at sufficiently low temperatures and pressures that polymerizable materials remaining in the liquid feed to these stills do not deposit out in these stills. At the same time, the polymerizable material in the gases in pipes 14a and 55a from the accumulators is removed in the mineral seal oil absorption steps, and the depropanizers 17 and 59 are thus operated at optimum temperatures and pressures to produce depropanized bottoms and a satisfactory overhead LPG product without polymer deposition on the reboiler coils or in the columns.

While the above flow diagram has been described for illustrative purposes, the invention obviously is not limited thereto.

I claim:

1. In a process for producing butadiene from n-butane by catalytic dehydrogenation of n-butane, the improvement comprising introducing the effluent of said catalytic dehydrogenation into a separation vessel under a superatmospheric pressure and therein separating a liquid phase from a vapor phase, withdrawing said vapor phase and in an absorption-stripping operation separating from said vapor phase a fuel gas comprising $C_1$ and $C_2$ hydrocarbons as one product of the process and a fluid comprising LPG, $C_3$ and $C_4$ hydrocarbons, depropanizing said fluid thereby producing an LPG product as another product of the process and a $C_4$ hydrocarbon stream, reducing the pressure on the liquid phase from said separation vessel in a flashing operation thereby producing flash vapor and residual liquid, introducing the flash vapor into said separation vessel, combining said $C_4$ hydrocarbon stream with the residual liquid of said flashing operation, and separating this combined stream by distillation into an overhead product comprising butene-1 and a bottoms product comprising butene-2.

2. In the process of claim 1, carrying out the distillation of the residual liquid of said flashing operation with a kettle temperature of about 165° F. at the pressure of about 125 pounds per square inch gage.

3. In an operation for porducing butene-1 and butene-2 by the catalytic dehydrogenation of n-butane wherein propane, propylene and polymerizable material are inadvertently produced in the catalytic operation and said propane and propylene are separated from the dehydrogenation effluent at a temperature and pressure sufficiently high to produce a specification LPG product comprising propane and propylene, and solid polymeric material is deposited on the heat exchanger tubes and on the inner walls and on the vapor-liquid contact promoting apparatus in the depropanizing column at said temperature and pressure, a method for carrying out this operation whereby the polymer forming material is retained in a liquid phase comprising reducing the pressure of said dehydrogenation effluent from a superatmospheric pressure to a lower superatmospheric pressure in a flashing operation and thereby producing a vapor phase rich in propane and propylene and containing lower boiling material and a liquid phase substantially devoid of propane and propylene, distilling the liquid phase at a kettle temperature of about 165° F. at a pressure of about 125 pounds per square inch gage, from this latter distilling operation removing an overhead product comprising butene-1 and a bottoms product comprising hydrocarbons boiling higher than butene-1 and polymer forming material in solution, separating said lower boiling material as a fuel gas product from $C_3$ hydrocarbons and higher boiling hydrocarbons of said vapor phase, distilling the separated $C_3$ hydrocarbons and higher boiling material to produce an LPG product comprising $C_3$ hydrocarbons and a bottoms material, and returning this bottoms materail to the first mentioned distilling operation.

4. In an operation for producing butene-1 and butene-2 by catalytic dehydrogenation of n-butane where in propane, propylene and polymerizable material are inadvertently produced in the catalytic operation and said propane and propylene are separated from the dehydrogenation effluent at a temperature and pressure sufficiently high to produce a bottoms product substantially free of propane and propylene and an overhead LPG specification product comprising propane and propylene, and solid polymeric material is deposited on the heat exchanger tubes and on the inner walls and on the vapor-liquid contact promoting apparatus in the depropanizing column at said temperature and pressure, a method for carrying out this operation whereby the polymer forming material is retained in a liquid phase comprising, reducing the pressure of said dehydrogenation effluent from a pressure above about 180 pounds per square inch gage to a pressure of about 80 pounds per square inch gage in a flashing operation thereby producing a liquid phase and a vapor phase, distilling the liquid phase at a kettle temperature of about 165° F. at a pressure of about 125 pounds per square inch gage, from this latter distilling operation removing an overhead product comprising butene-1 and a bottoms product comprising hydrocarbons boiling higher than butene-1 and polymer forming material in solution.

5. In an operation for producing butene-1 and butene-2 by catalytic dehydrogenation of n-butane wherein propane, propylene and polymerizable material are inadvertently produced in the catalytic operation and said propane and propylene are separated from the dehydrogenation effluent at a temperature and pressure sufficiently high to produce a bottoms product substantially free of propane and propylene and an overhead LPG specification product comprising propane and propylene, and solid polymeric material is deposited on the heat exchanger tubes and on the inner walls and on the vapor-liquid contact promoting apparatus in the depropanizing column at siad temperature and pressure, a method for carrying out this operation whereby the polymer forming material is retained in a liquid phase comprising, reducing the pressure of said dehydrogenation effluent from a pressure above about 180 pounds per square inch gage to a pressure of about 120 pounds per square inch gage in a first flashing operation thereby producing a first vapor phase and a first liquid phase, reducing the pressure on said first liquid phase in a second flashing operation to a pressure of about 80 pounds per square inch gage thereby producing a second vapor phase and a second liquid phase, distilling this second liquid phase at a kettle temperature of about 165° F. at a pressure of about 125 pounds per square inch gage, from this latter distilling operation removing an overhead product comprising butene-1 and a bottom product comprising hydrocarbons boiling higher than butene-1 and polymer forming material in solution.

References Cited in the file of this patent
UNITED STATES PATENTS

| | | |
|---|---|---|
| 2,386,310 | Hachmuth | Oct. 9, 1945 |
| 2,554,054 | Owen | May 22, 1951 |
| 2,588,323 | Kniel | Mar. 4, 1952 |
| 2,745,889 | Johnston et al. | May 15, 1956 |

UNITED STATES PATENT OFFICE
CERTIFICATE OF CORRECTION

Patent No. 2,850,550                                      September 2, 1958

Gene K. Reinmuth

It is hereby certified that error appears in the printed specification of the above numbered patent requiring correction and that the said Letters Patent should read as corrected below.

Column 1, line 47, for "steps" read -- step --; column 4, line 66, for "buene-2" read -- butene-2 --; column 6, line 41, for "porducing" read -- producing --; line 72, for "terail" read -- terial --; line 74, for "where in" read -- wherein --; column 8, line 6, for "siad" read -- said --.

Signed and sealed this 25th day of August 1959.

(SEAL)
Attest:

KARL H. AXLINE

Attesting Officer

ROBERT C. WATSON
Commissioner of Patents